United States Patent [19]
Hageniers et al.

[11] Patent Number: 5,793,647
[45] Date of Patent: Aug. 11, 1998

[54] SYSTEM AND METHOD FOR GRAPHICAL IMAGE DATA ACQUISTION, STORAGE, AND RETRIEVAL

[75] Inventors: Omer L. Hageniers; Frank Karpala, both of Windsor, Canada

[73] Assignee: Diffracto, Ltd., Windsor, Canada

[21] Appl. No.: 515,156

[22] Filed: Aug. 15, 1995

[51] Int. Cl.⁶ .................................................. G09G 5/00
[52] U.S. Cl. .................... 364/507; 395/500; 395/507; 395/508; 345/121; 345/122
[58] Field of Search ........................... 364/507; 395/164, 395/508, 501, 511, 500, 173, 339, 340; 345/116, 121, 122

[56] References Cited

U.S. PATENT DOCUMENTS

| | | | |
|---|---|---|---|
| 5,276,805 | 1/1994 | Hamaguchi | 395/511 |
| 5,347,624 | 9/1994 | Takanashi et al. | 395/135 |
| 5,408,328 | 4/1995 | Boliek et al. | 358/261.4 |
| 5,414,811 | 5/1995 | Parulski et al. | 395/501 |
| 5,436,637 | 7/1995 | Gayraud et al. | 345/116 |
| 5,440,685 | 8/1995 | Takiyama et al. | 395/508 |
| 5,499,325 | 3/1996 | Dugan, Jr. | 395/132 |
| 5,519,410 | 5/1996 | Smalanskas et al. | 345/7 |
| 5,533,186 | 7/1996 | Tanahashi et al. | 395/164 |

Primary Examiner—Emanuel T. Voeltz
Assistant Examiner—Demetra R. Smith
Attorney, Agent, or Firm—Larson & Taylor

[57] ABSTRACT

A computerized system and a method for acquisition, storage, and retrieval of a plurality of image datas corresponding to a plurality of physical inspection areas of a physical surface is disclosed. A graphical interface graphically draws a virtual diagram of the physical surface and a plurality of virtual inspection areas on the virtual diagram. A sensor connected to the interface senses a plurality of image datas of the plurality of physical inspection areas. A display connected to the interface is also provided for selectively displaying the virtual diagram and the image data. An image storage connected to the interface collects the plurality of image datas and names an image file of each image data according to a graphical position of the corresponding virtual inspection area on the virtual diagram. A selector connected to the interface is then used for selecting a virtual inspection area corresponding to a desired physical inspection area of interest and for retrieving an image file of the desired physical inspection area from the image storage for display. In a preferred embodiment, a status of the virtual inspection areas are displayed, conveniently, by color coding. A desired inspection program is also indicated on the display.

25 Claims, 3 Drawing Sheets

SYSTEM AND METHOD FOR GRAPHICAL IMAGE DATA ACQUISTION, STORAGE, AND RETRIEVAL

FIELD OF THE INVENTION

The present invention relates generally to a graphical user interface system for image data collection, storage and file retrieval for aircraft inspection and other applications.

BACKGROUND OF THE INVENTION

Non-Destructive inspection of aircraft and other large complex structures using modern inspection devices leads to the generation of vast quantities of data, generally in an "image" format. This image format represents an X-Y area of the physical surface with gray scale or color information at multiple points (pixels) in that X-Y area, and this information represents the output value of the inspection device at those X-Y locations.

The types of inspection devices generally used in nondestructive inspection activities include, but are by no means limited to: ultrasound, eddy current, shearography, holography, imaging, X-Ray, MOI, etc. These devices all output an image, namely a representation of some variable over an X-Y region of the physical surface being inspected, and this data is then recorded in an electronic format. Typically, the output of these devices relates to only a small X-Y area of the total structure requiring inspection. In other words, only a small area is inspected at any one time, and an image is generated relative to only that small area inspected. Numerous such inspections are thus required to cover either the whole structure or selected areas of that structure of interest.

The images produced by inspection devices are generally stored in computer compatible file structures, and the outputs of the file structures are therefore organized into storage compatible formats. Examples of such file structures are TIF (Tagged Image File format) and BMP (Bit Mapped format). Both of these file structures store data that has an array of numbers, the values of which represent the value of some variable at an X-Y location. Typically, these files can be displayed in an image format on a TV monitor or VGA display, directly from the computer memory.

The collection of a large number of images relating to data scattered across a structure leads to the requirement for storing and later retrieving these images. This storage and subsequent recall generally requires that file names be created at storage time and that these file names subsequently be used to recall the images.

SUMMARY OF THE INVENTION

The present invention provides a computerized system and a method for acquisition, storage, and retrieval of a plurality of image datas corresponding to a plurality of physical inspection areas of a physical surface. Initially, a graphical interface means graphically draws a virtual diagram of the physical surface and a plurality of virtual inspection areas on the virtual diagram. These virtual inspection areas represent corresponding physical inspection areas on the physical surface for which image datas are to be collected. A sensing means connected to the interface means then senses a plurality of image datas of the plurality of physical inspection areas of the physical surface. A display means connected to the interface means is also provided for selectively displaying the virtual diagram and the image data. An image storage means connected to the interface means collects the plurality of image datas of the physical inspection areas sensed by the sensing means and names an image file of each image data of each respective physical inspection area according to a graphical position of the corresponding virtual inspection area on the virtual diagram. A selection means connected to the interface means is then used for selecting a virtual inspection area on the virtual diagram corresponding to a desired physical inspection area of interest and for retrieving an image file of the desired physical inspection area from the image storage means for display by the display means.

In a preferred embodiment, a status means connected to the interface means visually indicates a status of the virtual inspection areas of the virtual diagram displayed by the display means. Conveniently, the status means indicates the status of each virtual inspection area on the virtual diagram by color coding of the virtual inspection areas. In addition, an inspection requirements means stores a desired inspection program of successive physical inspection areas for the physical surface and indicates a next desired virtual inspection area corresponding to a next desired physical inspection area on the physical surface after the sensor means senses each successive physical inspection area.

In the preferred embodiment, the virtual diagram of the interface means includes virtual reference features drawn on the virtual diagram, which virtual reference features correspond to physical reference features provided on the physical surface. If desired, the virtual reference features are added to the virtual image by the interface means as desired, and corresponding physical reference features are then added to the physical surface. Alternately or additionally, the virtual diagram of the interface means includes labels which describe positions on the physical surface.

Also in the preferred embodiment, a sensor control means connected to the graphical interface communicates with and controls the operation of the sensor means. Such control includes moving the sensor means into position to sense image data of predetermined physical inspection areas corresponding to predetermined virtual inspection areas. A sensor specifications storage means is also identifies a type of the sensor means and chooses appropriately sized virtual inspection areas on the virtual diagram corresponding to a physical inspection footprint of the sensor means.

Further in the preferred embodiment, the selection means includes an input means adds, changes, moves and deletes virtual inspection areas from the virtual diagram. For each added virtual inspection area added, the selection means also creates a new file name in the image storage means. Conveniently, the interface means draws the virtual image so that points of the physical surface are mapped to points of the virtual diagram. A locating means connected to the interface means then locates the sensor means with reference to the physical surface.

The present invention described herein is a convenient and highly useful system and method to store and recall such data in a graphical environment which is easy to use by the person who is collecting or recalling such data.

Other features and advantages of the present invention are stated in or apparent from detailed descriptions of presently preferred embodiments of the invention found hereinbelow.

DETAILED DESCRIPTION OF THE PREFERRED EMBODIMENTS

Figure 1:
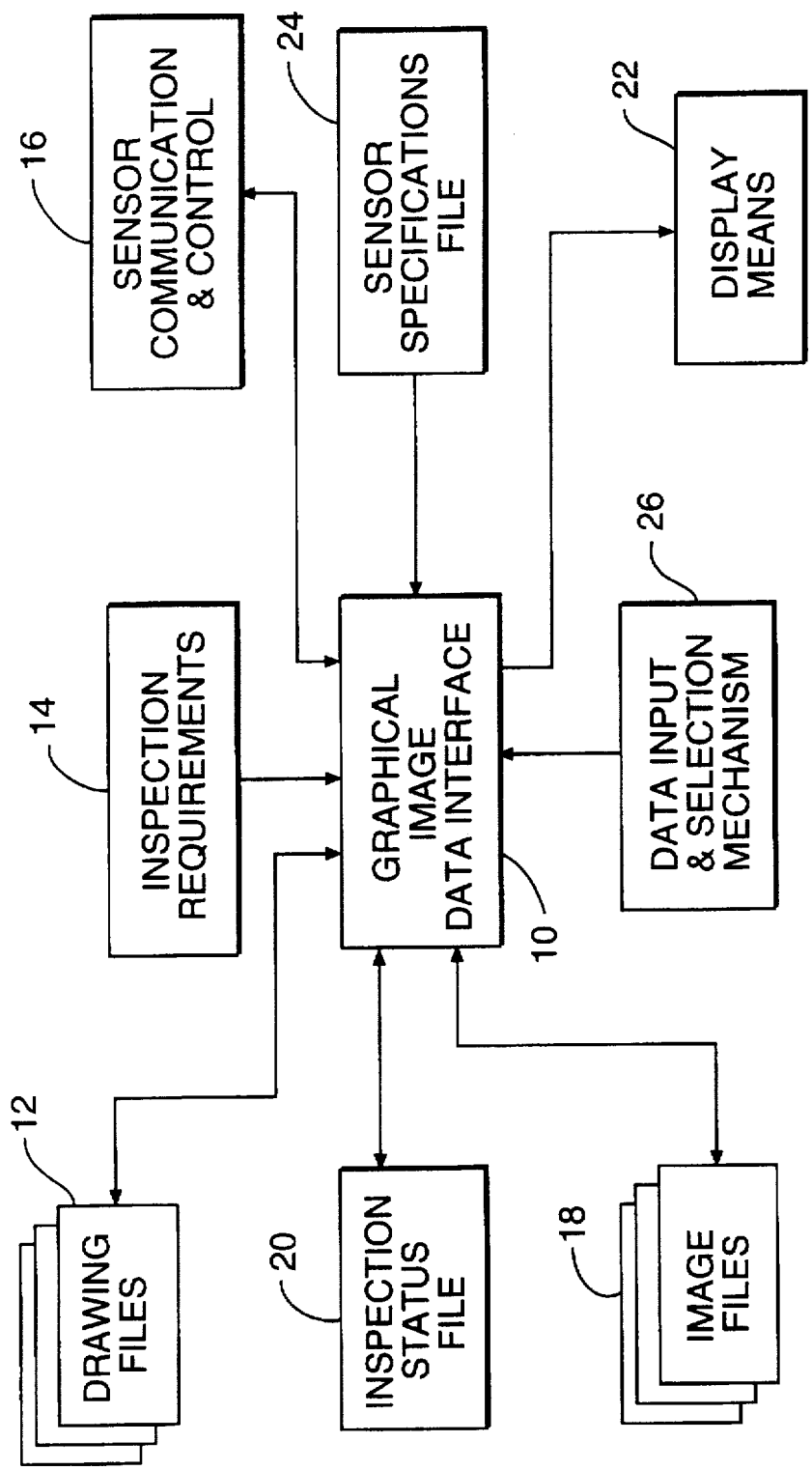
FIG. 1 is a schematic representation of the system of the present invention.

The system of the present invention is schematically depicted in FIG. 1 and includes a graphical image data interface 10 as part of a computer that provides the ability to graphically input or draw a set of rectangular virtual inspection areas 28' on a virtual diagram 30' representing the rectangular physical inspection areas 28 (image areas or sites) captured by a sensor 40 (shown schematically) placed on the physical surface 30 of a structure (such as an aircraft). For convenience herein, it will be appreciated that the term "physical" is used to denote aspects of the physical surface 30, while the term "virtual" is used to denote aspects of the computer-generated virtual diagram 30' of the physical surface 30. The virtual inspection areas 28' are positioned in a computer drawing file (or series of files) 12 of the virtual diagram 30' in a logical pattern or sequence according to inspection requirements 14 for the physical surface 30. The system also provides a sensor communication and control 16 for communicating with the sensor 40 and for controlling the operation of sensor 40. Image data collected from the sensor 40 is stored in separate image files 18 whose names are derived from the graphical position of the physical inspection areas 28 on the physical surface 30.

The status of an inspection process of the physical surface 30 is stored in an inspection status file 20 or database and is indicated to the user through color coding of the physical inspection areas 28 of the physical surface 30. Retrieval of the image data for the purposes of analysis, display, or printing with a suitable display means 22 is performed by selecting one of the defined virtual inspection areas 28' on the virtual diagram 30' corresponding to the physical inspection area 28 of interest on the physical surface 30. The position of the virtual inspection area 28' on the virtual diagram 30' references an image data file 18 so that a specific name for that virtual inspection area (physical inspection area) or file is not needed. All reference to the image data files 18 is thus by positional reference on the virtual diagram 30'.

Figure 2A:
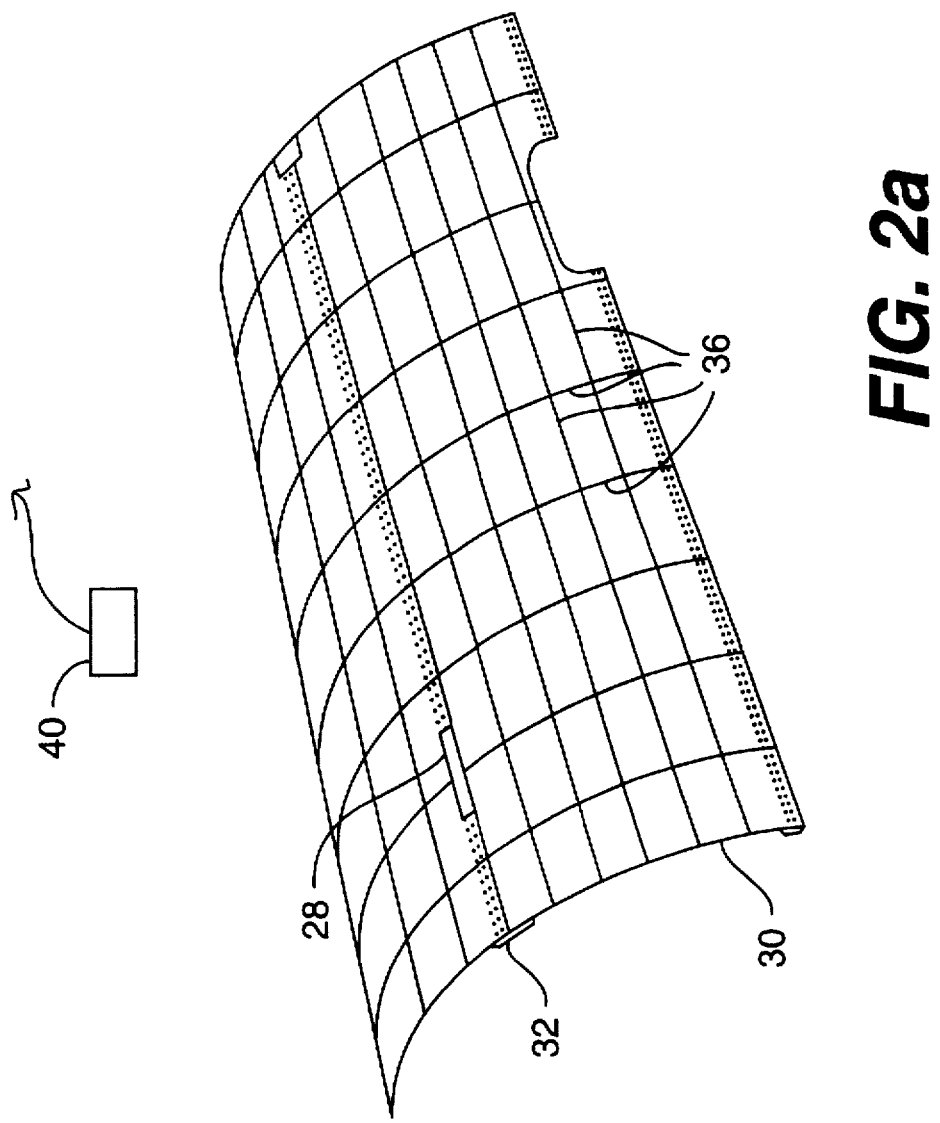
FIG. 2a is a perspective view of a physical surface to be inspected using the system of the present invention.

The key input element to the system is the computer drawing or virtual diagram 30' of the structure being inspected. This virtual diagram 30' is typically a CAD (computer aided design) drawing of the structure, either in a two or three dimensional format, that displays key structural details or virtual features 36' which can be used as visual reference points both on the virtual diagram 30' and on the physical surface 30. In some cases, these virtual features 36' may be artificial reference lines 36 that are placed (physically drawn) temporarily on the physical surface 30 relative to some identifiable physical points during the inspection process when no other visual reference points are available. An example of a virtual diagram 30' for a section of a lap joint 32 on an aircraft fuselage skin (physical surface 30) is shown in FIG. 2a.

Figure 2B:
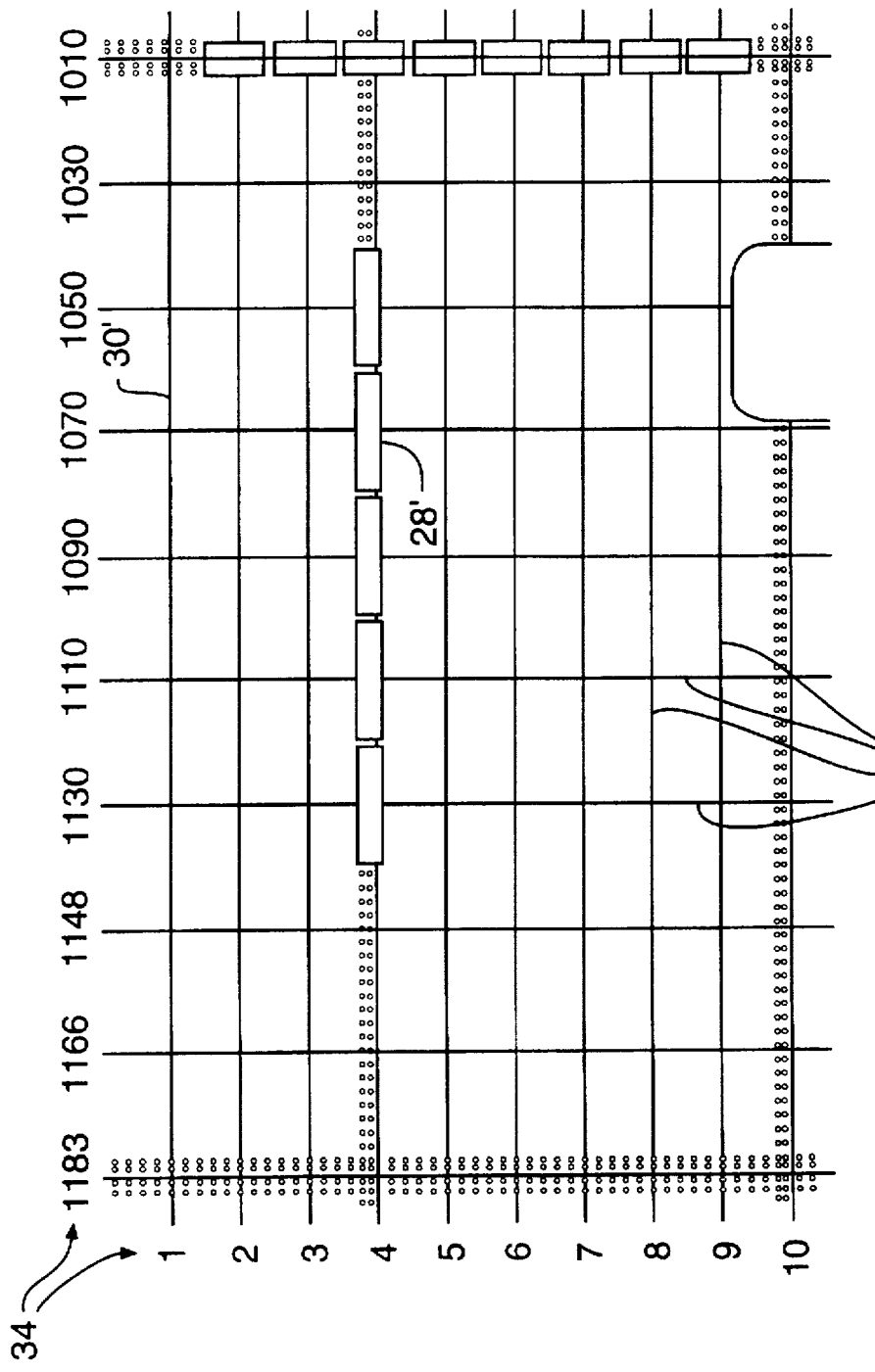
FIG. 2b is a two dimensional virtual diagram of the physical surface depicted in FIG. 2a produced by the system of the present invention.

Standard industry labels 34, commonly used by engineers and technicians to describe positions on the aircraft surface, should be included in the virtual diagram 30' for reference purposes and ease of communication. In some cases, the virtual diagram 30' may be organized as separate pages to improve the organization of the entire inspection plan. The virtual diagram 30' should be drawn to the scale of the physical surface 30 as much as possible, however, an unwrapped planar representation or virtual diagram 30' of a curved physical surface 30 (as shown by FIGS. 2b and 2a) is equally useful provided it is drawn in a scale similar to the scale of the sensor 40 footprint dimensions. Although not necessary, a mapping function derived through calibration or mathematical means to describe the relationship between any point on the virtual diagram 30' and the physical surface 30 provides additional benefits to the system as is evident from FIGS. 2a and 2b.

Computer software provides the ability to import this virtual diagram 30' into the system or create it and then allow access to any point on the virtual diagram 30' through zoom and pan operations. A crucial part of the system is the ability to locate or layout virtual inspection areas (areas) 28' on the virtual diagram 30' representing the physical inspection areas 28 on the physical surface 30 before the virtual diagram 30' is used to collect image data. These inspection areas 28' are locatable at any point on the virtual diagram 30' and represent the area of physical inspection area 28 of the physical surface 30 to be inspected during a single placement of the inspection device or sensor 40. The X-Y area specifications of all varieties of sensors 40 that could be used to inspect the physical surface 30 should be available in a sensor specifications file 24 of the system.

The ability to graphically create and edit sensor virtual inspection areas 28' on the virtual diagram 30' is a crucial function of the system for the purposes of planning the inspection process as shown in FIG. 2b. These placement editing functions include the ability to specify the sensor 40 model; and to create a virtual inspection area 28' on the virtual diagram 30' in a specified location and orientation using a pointing device or mouse using a data input and selection mechanism 26, one at a time, a line at a time, or an array of physical inspection areas 28 at a time. The ability to add, change, move and delete virtual inspection areas 28' and hence to sense corresponding physical inspection areas 28 as desired should also be provided. As each new virtual inspection area 28' (for each physical inspection area 28) is input on the virtual diagram 30', a file name is created internally to be used with sensor 40 image data once this image data is collected in image files 18.

Any consistent internal file naming convention can be used, provided that the name is unique and satisfies the syntax of the operating system. By using the computer system via a mouse, touch screen or other selection device, one can select a particular virtual inspection area 28' on the virtual diagram 30' and immediately access the image data at the image file 12 file storage location in the computer system. In other words, access to file storage locations from the user's point of view is not by file name, as is traditionally done, but by the selection of a location (virtual inspection area 28') on the virtual diagram 30'.

An alternate method for creating the inspection plan is possible if the mapping function between points on the virtual diagram 30' and the physical surface 30 is available. If the sensor 40 is equipped with a device or mechanism to report its position relative to some datum on the structure, such information could be used in a teach mode to create virtual inspection areas 28' on the virtual diagram 30' while a technician runs through the inspection cycle physically with the sensor 40 on the physical surface 30. This method has some obvious advantages including the ability to design the inspection plan based on the access provided by the available platforms. This method also takes into account physical barriers, other anomalies of the inspection due to the environment that may not be obvious from the virtual diagram 30' alone, and an inspection sequence that may be more appropriate because it has actually been used in the run through.

Once an inspection plan is created, it can be copied and used for a specific structure requiring inspection. At this stage, the inspection plan consists of a virtual diagram 30' and a set of virtual inspection areas 28' on the virtual diagram 30' having the footprint dimensions for a specific type of sensor (or sensors) 40. To initiate data acquisition, a particular virtual inspection area 28' is selected from the virtual diagram 30'. The system communicates with the sensor 40 and validates the sensor 40 type, acquisition parameters are adjusted if necessary, a preview image is displayed (optional), and on a command from the user, the image data is saved to a image file 12 of the storage device with the file name created at the time the virtual inspection area 28' was defined. The sensor 40 is positioned on the physical surface 30 of the structure as indicated in the virtual diagram 30' and if appropriate devices are installed on the sensor 40, the position can be verified through the mapping function between positions on the virtual diagram 30' and the physical surface 30. In addition, if the connected sensor 40 is invalid, the appropriate sensor 40 model can be requested by the system.

After acquiring an image, the system will automatically index (highlight) the next virtual inspection area 28' on the virtual diagram 30'. The highlighted virtual inspection area 28' is the next position in the sequence or optionally, if the reverse direction is selected, the previous position in the sequence. This new position is presented at the center of the display 22 automatically. The auto index feature reduces the workload for the user by graphically highlighting the next position (physical inspection area 28) requiring inspection and its location on the virtual diagram 30' and hence on the physical surface 30 without any input from the user.

During a data collection sequence at multiple physical inspection areas 28 on the physical surface 30, it is possible to use a color coding process that will indicate whether or not an image has been taken and stored relative to any physical inspection area 28. For example, initially all virtual inspection areas 28' could be blue, turning to magenta after the image data is stored. A user of this system can therefore determine at any time during the gathering of data by visual inspection of the virtual diagram 30', at which physical inspection areas 28 on the structure images have already been stored (magenta colored virtual inspection area 28') and at which physical inspection areas 28 inspections remain to be carried out (blue colored virtual inspection areas 28').

Subsequent to data collection, the color-coded virtual diagram 30' can be used as a way to view or analyze acquired image data, either randomly or in sequence, for particular physical inspection areas 28 of interest on the physical surface 30 by selecting the corresponding virtual inspection area 28' on the virtual diagram 30'. During this analysis, it is possible for the individual to record additional information about the image or process images visually; or by selecting an algorithm, to detect the presence of anomalies or defects and to quantify their severity. During this analysis, it is possible to record the result of the analysis by changing the color of the virtual inspection area 28' on the virtual diagram 30'. For example, the magenta color of the virtual inspection area 28' could be changed to red to indicate the presence of an unacceptable defect if the severity level is judged or computed to be above a pre-selected severity level. The absence of any defects could be color coded as green. Other, intermediate levels are also possible to define and color code. Image data that is unacceptable for analysis or interpretation due to its quality can be color marked as well (i.e. yellow) to indicate that the image data should be reacquired. The status of the entire inspection process simplifies to a visual inspection of the virtual diagram 30' where blue virtual inspection areas 28' have no data, magenta virtual inspection areas 28' have data but are not analyzed, red virtual inspection areas 28' indicate analysis and the presence of severe defects, while green virtual inspection areas 28' indicate analysis and no defects. The analysis of captured data prior to the collection of all the data ensures efficient use of the inspectors time when other maintenance personnel may be preventing the inspection to be completed.

For hard copy output, the color coded virtual diagram 30' provides a convenient way to select the areas of interest by choosing the virtual inspection areas 28' by their color or position on the virtual diagram 30'. Both the image data and the portion of the virtual diagram 30' containing the corresponding virtual inspection area 28' along with reference labels should be printed to maintain the graphical relationship between the data and its location on the physical surface 30. Color printers should be used whenever possible; but, the colors could be remapped to levels of gray or crosshatching for black and white printers.

In the case where more than one type of inspection device will be used on the same area on the physical surface 30, it is possible to have two or more layers of data storage represented at each virtual inspection area 28' predefined on the virtual diagram 30'. This provides the capability to carry out both eddy current inspection and ultrasound inspection (for example) at a given physical inspection area, to store the images for subsequent analysis, and to provide an opportunity for data fusion. When the footprint dimensions of the inspection devices differ and/or the areas have varying overlap, it may be necessary to allow the definition of a viewport of a fixed size that will access several images and create a composite image. Each sensor 40 type (i.e. image data type) used in the inspection process will have its own composite image.

The system will also provide the ability to define areas on the virtual diagram 30' that have been modified or are planned to be modified subsequent to data collection, as may occur after a repair, to provide a visual display of data integrity or validity based on the condition of the physical surface 30 since the last inspection. Virtual inspection areas 28', whose modification is confirmed, should be indicated by color coding.

While the present invention has been described with respect to exemplary embodiments thereof, it will be understood by those of ordinary skill in the art that variations and modifications can be effected within the scope and spirit of the invention.

What is claimed is:

1. A computerized system for acquisition, storage, and retrieval of a plurality of image datas corresponding to a plurality of physical inspection areas of a physical surface comprising:

a graphical interface means for graphically drawing a virtual diagram of the physical surface and a plurality of virtual inspection areas on the virtual diagram, the virtual inspection areas representing corresponding physical inspection areas on the physical surface for which image datas are collected;

a sensing means connected to said interface means for sensing a plurality of image datas of the plurality of physical inspection areas of the physical surface;

a display means connected to said interface means for selectively displaying the image data and the virtual diagram;

an image storage means connected to said interface means for collecting the plurality of image datas of the physical inspection areas sensed by said sensing means and for naming an image file of each image data of each respective physical inspection area according to a graphical position of the corresponding virtual inspection area on the virtual diagram;

a selection means connected to said interface means for selecting a virtual inspection area on the virtual diagram corresponding to a desired physical inspection area of interest and for retrieving an image file of the desired physical inspection area from said image storage means for display by said display means; and a status means connected to said interface means for visually indicating a status of the virtual inspection areas of the virtual diagram displayed by said display means by color coding of the virtual inspection areas.

2. A computerized system as claimed in claim 1 wherein the virtual diagram of said interface means includes virtual reference features drawn on the virtual diagram, the virtual reference features corresponding to physical reference features provided on the physical surface.

3. A computerized system as claimed in claim 2, wherein the virtual reference features are added to the virtual diagram by said interface means as desired such that corresponding physical reference features are then added to the physical surface.

4. A computerized system as claimed in claim 1 wherein the virtual diagram of said interface means includes labels which describe positions on the physical surface.

5. A computerized system as claimed in claim 1 and further including a sensor control means connected to said graphical interface for communicating with and for controlling operation of said sensor means.

6. A computerized system as claimed in claim 1 wherein said selection means includes an input means for adding, changing, moving and deleting virtual inspection areas from the virtual diagram, and further for creating a new file name in said image storage means for each added virtual inspection area.

7. A computerized system as claimed in claim 1 wherein said interface means draws the virtual diagram so that points of the physical surface are mapped to points of the virtual diagram; and further including a locating means connected to said interface means for locating said sensor means with reference to the physical surface.

8. A method for acquisition, storage, and retrieval of a plurality of image datas corresponding to a plurality of inspection areas of a physical surface comprising the steps of:

graphically drawing a virtual diagram of the physical surface and a plurality of virtual inspection areas on the virtual diagram on a graphical interface, the virtual inspection areas representing corresponding physical inspection areas on the physical surface for which image datas are to be collected;

sensing a plurality of image datas of the plurality of physical inspection areas of the physical surface with a sensor connected to the graphical interface;

displaying the virtual diagram with a display device connected to the graphical interface;

storing the plurality of image datas of the physical inspection areas sensed by the sensor and naming an image file of each image data of each respective physical inspection area stored according to a graphical position of the corresponding virtual inspection area on the virtual diagram in an image storage connected to the graphical interface;

selecting a virtual inspection area on the virtual diagram corresponding to a desired physical inspection area of interest with a selector connected to the graphical interface;

retrieving an image file of the desired physical inspection area from the image storage for display by the display device; and visually indicating a status of the virtual inspection areas of the virtual diagram displayed by the display device with a status generator connected to the graphical interface by color coding of the virtual inspection areas.

9. A method for acquisition, storage, and retrieval as claimed in claim 8 wherein said graphical drawing step further includes the step of drawing virtual reference features on the virtual diagram corresponding to physical reference features provided on the physical surface.

10. A method for acquisition, storage, and retrieval as claimed in claim 9 wherein the virtual reference features are added to the virtual diagram by the graphical interface as desired and further including the step of adding corresponding physical reference features to the physical surface.

11. A method for acquisition, storage, and retrieval as claimed in claim 8 and further including the step of drawing labels on the virtual diagram which describe positions on the physical surface.

12. A method for acquisition, storage, and retrieval as claimed in claim 8 and further including the steps of communicating with and controlling operation of the sensor with a sensor control connected to the graphical interface.

13. A method for acquisition, storage, and retrieval as claimed in claim 8 and further including the steps of adding, changing, moving and deleting virtual inspection areas from the virtual diagram with an input device, and creating a new file name in the image storage for each added virtual inspection area.

14. A computerized system for acquisition, storage, and retrieval of a plurality of image datas corresponding to a plurality of physical inspection areas of a physical surface comprising:

a graphical interface means for graphically drawing a virtual diagram of the physical surface and a plurality of virtual inspection areas on the virtual diagram, the virtual inspection areas representing corresponding physical inspection areas on the physical surface for which image datas are collected;

a sensing means connected to said interface means for sensing a plurality of image datas of the plurality of physical inspection areas of the physical surface;

a display means connected to said interface means for selectively displaying the image data and the virtual diagram;

an image storage means connected to said interface means for collecting the plurality of image datas of the physical inspection areas sensed by said sensing means and for naming an image file of each image data of each respective physical inspection area according to a graphical position of the corresponding virtual inspection area on the virtual diagram;

a selection means connected to said interface means for selecting a virtual inspection area on the virtual diagram corresponding to a desired physical inspection area of interest and for retrieving an image file of the desired physical inspection area from said image storage means for display by said display means;

a status means connected to said interface means for visually indicating a status of the virtual inspection areas of the virtual diagram displayed by said display means; and an inspection requirements means for storing a desired inspection program of successive physical inspection areas for the physical surface and for indicating a next desired virtual inspection area corresponding to a next desired physical inspection area on the physical surface after said sensor means senses each successive physical inspection area.

15. A computerized system as claimed in claim 14 and further including a sensor control means connected to said graphical interface for communicating with and for controlling operation of said sensor means.

16. A computerized system for acquisition, storage, and retrieval of a plurality of image datas corresponding to a plurality of physical inspection areas of a physical surface comprising:

a graphical interface means for graphically drawing a virtual diagram of the physical surface and a plurality of virtual inspection areas on the virtual diagram, the virtual inspection areas representing corresponding physical inspection areas on the physical surface for which image datas are collected;

a sensing means connected to said interface means for sensing a plurality of image datas of the plurality of physical inspection areas of the physical surface;

a display means connected to said interface means for selectively displaying the image data and the virtual diagram;

an image storage means connected to said interface means for collecting the plurality of image datas of the physical inspection areas sensed by said sensing means and for naming an image file of each image data of each respective physical inspection area according to a graphical position of the corresponding virtual inspection area on the virtual diagram;

a selection means connected to said interface means for selecting a virtual inspection area on the virtual diagram corresponding to a desired physical inspection area of interest and for retrieving an image file of the desired physical inspection area from said image storage means for display by said display means; and a sensor specifications storage means for identifying a type of said sensor means and for choosing appropriately sized virtual inspection areas on the virtual diagram corresponding to a physical inspection footprint of said sensor means.

17. A computerized system as claimed in claim 16, and further including a sensor control means connected to said graphical interface for communicating with and for controlling operation of said sensor means.

18. A computerized system for acquisition, storage, and retrieval of a plurality of image datas corresponding to a plurality of physical inspection areas of a physical surface comprising:

a graphical interface means for graphically drawing a virtual diagram of the physical surface and a plurality of virtual inspection areas on the virtual diagram, the virtual inspection areas representing corresponding physical inspection areas on the physical surface for which image datas are collected so that points of the physical surface are mapped to points of the virtual diagram:

a sensing means connected to said interface means for sensing a plurality of image datas of the plurality of physical inspection areas of the physical surface;

a display means connected to said interface means for selectively displaying the image data and the virtual diagram;

an image storage means connected to said interface means for collecting the plurality of image datas of the physical inspection areas sensed by said sensing means and for naming an image file of each image data of each respective physical inspection area according to a graphical position of the corresponding virtual inspection area on the virtual diagram;

a selection means connected to said interface means for selecting a virtual inspection area on the virtual diagram corresponding to a desired physical inspection area of interest and for retrieving an image file of the desired physical inspection area from said image storage means for display by said display means;

a locating means connected to said interface means for locating said sensor means with reference to the physical surface; and a sensor control means connected to said graphical interface for moving said sensor means into position to sense image data of predetermined physical inspection areas corresponding to predetermined virtual inspection areas.

19. A method for acquisition, storage, and retrieval of a plurality of image datas corresponding to a plurality of inspection areas of a physical surface comprising the steps of:

graphically drawing a virtual diagram of the physical surface and a plurality of virtual inspection areas on the virtual diagram on a graphical interface, the virtual inspection areas representing corresponding physical inspection areas on the physical surface for which image datas are to be collected;

sensing a plurality of image datas of the plurality of physical inspection areas of the physical surface with a sensor connected to the graphical interface;

displaying the virtual diagram with a display device connected to the graphical interface;

storing the plurality of image datas of the physical inspection areas sensed by the sensor and naming an image file of each image data of each respective physical inspection area stored according to a graphical position of the corresponding virtual inspection area on the virtual diagram in an image storage connected to the graphical interface;

selecting a virtual inspection area on the virtual diagram corresponding to a desired physical inspection area of interest with a selector connected to the graphical interface;

retrieving an image file of the desired physical inspection area from the image storage for display by the display device;

visually indicating a status of the virtual inspection areas of the virtual diagram displayed by the display device with a status generator connected to the graphical interface; and modifying the surface at a selected physical inspection area when the corresponding virtual inspection area indicates an unacceptable status, and changing the status of the modified virtual inspection area on the virtual diagram after modification is effected.

20. A method for acquisition, storage, and retrieval as claimed in claim 19, and further including the steps of communicating with and controlling operation of the sensor with a sensor control connected to the graphical interface.

21. A method for acquisition, storage, and retrieval of a plurality of image datas corresponding to a plurality of inspection areas of a physical surface comprising the steps of:

graphically drawing a virtual diagram of the physical surface and a plurality of virtual inspection areas on the virtual diagram on a graphical interface, the virtual inspection areas representing corresponding physical inspection areas on the physical surface for which image datas are to be collected;

sensing a plurality of image datas of the plurality of physical inspection areas of the physical surface with a sensor connected to the graphical interface;

displaying the virtual diagram with a display device connected to the graphical interface;

storing the plurality of image datas of the physical inspection areas sensed by the sensor and naming an image file of each image data of each respective physical inspection area stored according to a graphical position of the corresponding virtual inspection area on the virtual diagram in an image storage connected to the graphical interface;

selecting a virtual inspection area on the virtual diagram corresponding to a desired physical inspection area of interest with a selector connected to the graphical interface;

retrieving an image file of the desired physical inspection area from the image storage for display by the display device;

visually indicating a status of the virtual inspection areas of the virtual diagram displayed by the display device with a status generator connected to the graphical interface:

storing a desired inspection program of successive physical inspection areas for the physical surfaces and indicating a next desired virtual inspection area corresponding to a next desired physical inspection area on the physical surface after the sensor senses each successive physical inspection area.

22. A method for acquisition, storage, and retrieval as claimed in claim 21 and further including the steps of communicating with and controlling operation of the sensor with a sensor control connected to the graphical interface.

23. A method for acquisition, storage, and retrieval of a plurality of image datas corresponding to a plurality of inspection areas of a physical surface comprising the steps of:

graphically drawing a virtual diagram of the physical surface and a plurality of virtual inspection areas on the virtual diagram on a graphical interface, the virtual inspection areas representing corresponding physical inspection areas on the physical surface for which image datas are to be collected;

sensing a plurality of image datas of the plurality of physical inspection areas of the physical surface with a sensor connected to the graphical interface;

displaying the virtual diagram with a display device connected to the graphical interface;

storing the plurality of image datas of the physical inspection areas sensed by the sensor and naming an image file of each image data of each respective physical inspection area stored according to a graphical position of the corresponding virtual inspection area on the virtual diagram in an image storage connected to the graphical interface;

selecting a virtual inspection area on the virtual diagram corresponding to a desired physical inspection area of interest with a selector connected to the graphical interface;

retrieving an image file of the desired physical inspection area from the image storage for display by the display device;

identifying a type of the sensor from a sensor specifications storage; and choosing appropriately sized virtual inspection areas on the virtual diagram corresponding to a physical inspection footprint of the sensor.

24. A method for acquisition, storage, and retrieval as claimed in claim 23 and further including the steps of communicating with and controlling operation of the sensor with a sensor control connected to the graphical interface.

25. A method for acquisition, storage, and retrieval of a plurality of image datas corresponding to a plurality of inspection areas of a physical surface comprising the steps of:

graphically drawing a virtual diagram of the physical surface and a plurality of virtual inspection areas on the virtual diagram on a graphical interface, the virtual inspection areas representing corresponding physical inspection areas on the physical surface for which image datas are to be collected and with points of the physical surface mapped to points of the virtual diagram;

sensing a plurality of image datas of the plurality of physical inspection areas of the physical surface with a sensor connected to the graphical interface;

displaying the virtual diagram with a display device connected to the graphical interface;

storing the plurality of image datas of the physical inspection areas sensed by the sensor and naming an image file of each image data of each respective physical inspection area stored according to a graphical position of the corresponding virtual inspection area on the virtual diagram in an image storage connected to the graphical interface;

selecting a virtual inspection area on the virtual diagram corresponding to a desired physical inspection area of interest with a selector connected to the graphical interface;

retrieving an image file of the desired physical inspection area from the image storage for display by the display device;

locating the sensor with reference to the physical surface with a locating device connected to the graphical interface; and moving the sensor into position to sense image data of predetermined physical inspection areas corresponding to predetermined virtual inspection areas with a sensor control connected to the graphical interface.

* * * * *